United States Patent [19]

Owen

[11] Patent Number: 4,522,362
[45] Date of Patent: Jun. 11, 1985

[54] SUPPORT DEVICE PARTICULARLY USEFUL FOR DRAFTING TEMPLATES AND THE LIKE

[76] Inventor: Kelly Owen, 79 Hunter Point Rd., Pomona, Calif. 91766

[21] Appl. No.: 524,647

[22] Filed: Aug. 19, 1983

[51] Int. Cl.³ .............................................. A47F 7/00
[52] U.S. Cl. ................................................... 248/207
[58] Field of Search ................. 248/207, 225.1–225.4, 248/230, 225.31; 211/59.1, 57.1, 105.1

[56] References Cited

U.S. PATENT DOCUMENTS

| | | |
|---|---|---|
| 400,658 | 4/1889 | Gennert . |
| 583,673 | 6/1897 | Deplanty . |
| 722,349 | 3/1903 | Young . |
| 746,188 | 12/1903 | Sonsthagen . |
| 766,028 | 7/1904 | Fisher . |
| 809,607 | 1/1906 | Chundelah ........................... 248/230 |
| 973,319 | 10/1910 | Thunen . |
| 985,079 | 2/1911 | Venard . |
| 1,386,241 | 8/1921 | Deck . |
| 1,531,017 | 3/1925 | Miller .............................. 248/225.31 |
| 1,535,279 | 4/1925 | Yoder . |
| 1,592,200 | 7/1926 | Goss . |
| 1,716,826 | 6/1929 | Masten . |
| 1,791,019 | 2/1931 | Wilson . |
| 3,199,818 | 8/1965 | Ahara . |
| 3,239,181 | 3/1966 | Ellerbrock . |
| 3,337,880 | 8/1967 | Florek . |
| 3,396,929 | 8/1968 | Brown . |
| 3,504,878 | 4/1970 | Dressler . |
| 4,139,173 | 2/1979 | Kahn . |
| 4,367,819 | 1/1983 | Lewis ................................ 211/59.1 |

FOREIGN PATENT DOCUMENTS

| | | | |
|---|---|---|---|
| 440942 | 1/1968 | Switzerland ........................ 211/57.1 |
| 1233370 | 5/1971 | United Kingdom ............... 211/59.1 |

Primary Examiner—Reinaldo P. Machado
Assistant Examiner—Alvin Chin-Shue
Attorney, Agent, or Firm—Frank Frisenda, Jr.

[57] ABSTRACT

A unique support device is provided which is particularly useful for holding drafting templates and the like in a condition readily accessible to a working draftsman. The support device comprises an adjustable base member which is conveniently fastened to either vertical or horizontal framework of a standard overhead drafting-/artist desk lamp, the base member being oriented with its center at the intersection of x, y and z orthoginal axes; and a post extending outwardly from the base member, the post being angled both with respect to the x axis and the z axis. Accordingly, the inventive support device enables the draftsman or artist to store templates, triangles and the like in a neat and orderly fashion and within easy reach thereby providing quick and accurate access of the work tool desired.

6 Claims, 6 Drawing Figures

SUPPORT DEVICE PARTICULARLY USEFUL FOR DRAFTING TEMPLATES AND THE LIKE

BACKGROUND OF THE INVENTION

This invention relates to a support device and has particular reference to means for storing templates, triangles and other work tools within easy reach of a draftsman or artist.

The efficiency and quality of drafting and artwork, to a large extent, is dependent upon the draftsman or artist's ability to have quick and ready access to specific work tools. These work tools typically include a multitude of standard patterns or guides, commonly known as templates and triangles, for the drawing of repetitive lines and shapes.

Generally, the draftsman or artist when working, is seated at a large, flat desk illuminated by an overhead drafting/artist desk lamp. Conventional desk lamps usually include vertical and horizontal framework, and may be adjusted in a wide variety of positions to provide desired illumination of the work surface.

It has been the custom and practice of most draftsmen or artists to store templates, triangles and the like in cumbersome stacks to the left or right of the work surface. In this respect, it is not unusual for a draftsman to keep ten or more of such work tools nearby. Thus when a particular template or triangle is required by the artist, he or she must tediously search through the stack and hope to extricate the particular work tool desired without disturbing the remainder. This inefficient search and access for work tools operation is performed countless number of times by the draftsman or artist on a given project.

Accordingly, those skilled in the art have recognized a significant need for a support device for triangles, templates and the like which will keep work tools in a neat, orderly fashion and yet be readily accessible to a draftsman seated at his or her desk. The present invention fulfills these needs.

SUMMARY OF THE INVENTION

The present invention provides a unique support device particularly useful for storing work tools such as drafting templates, triangles and the like in a condition readily accessible to a draftsman or artist.

Briefly, and in general terms, the inventive support device comprises a base member having means for adjustably fastening the support device to an arm, for instance, of a standard artist desk lamp; the base member being oriented with its center point at the intersection of x, y and z orthoginal axes; and a post extending outwardly from the base member, the post being angled both with respect to the x axis and the z axis.

In a presently preferred embodiment, the post of the support device is angled upwardly with respect to the x axis in a range of from about 5° to about 45° and is angled in a range of from about 5° to about 45° with respect to the z axis. Further, the post preferably terminates with means for retaining such work tools, such as a lip, notch or ball element.

Thus, whether the unique support device is mounted to the vertical or horizontal arm of a conventional overhead desk lamp framework, the post of the device is suitably oriented to support and store such drafting work tools placed thereon in a neat and orderly manner.

The above and other objects and advantages will become apparent from the following more detailed description of the invention, taken in conjunction with the drawings.

DESCRIPTION OF THE PREFERRED EMBODIMENT

The present invention relates to a support device particularly useful for storing drafting work tools such as triangles, templates and the like, in a condition readily accessible to a working draftsman or artist.

Figure 1:
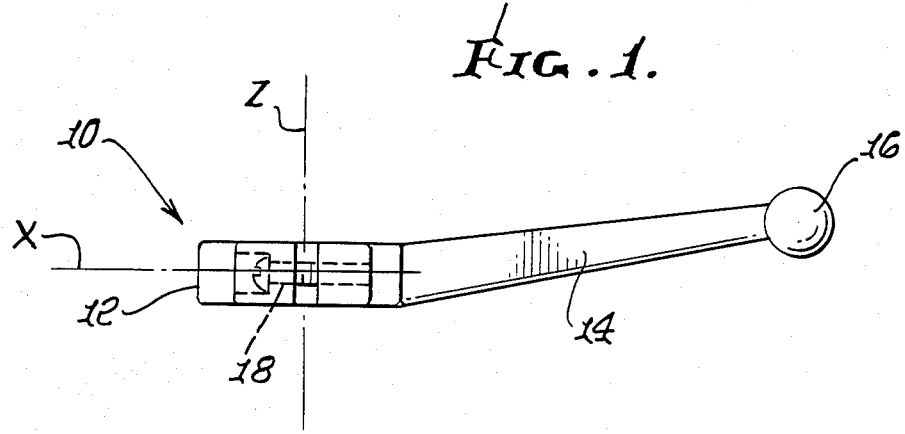
FIG. 1 is a top view of the unique support device in accordance with one embodiment of the present invention and illustrates a post extending outwardly from a base member.

Referring to FIG. 1, there is shown a unique support device in accordance with one embodied form of the invention. The support device, generally denoted 10, may be constructed from durable, resilient material, such as plastic, aluminum, stainless steel, among others.

Figure 2:
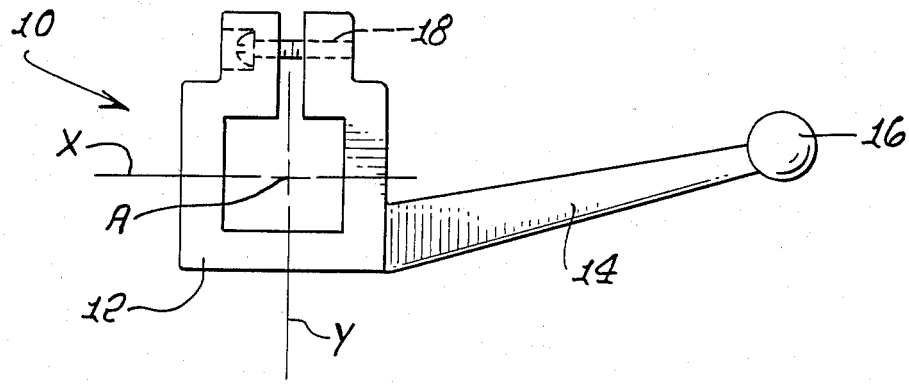
FIG. 2 is a side view of the unique support device shown in FIG. 1 in accordance with one embodied form of the invention.

In more detail, and to facilitate a convenient understanding of the present invention, reference is made to a base member 12 of the device 10 being oriented with its center A (FIG. 2) at the intersection of x, y and z orthoginal axes, as shown in FIGS. 1 and 2.

The unique support device 10 further comprises a post 14 extending outwardly from the base member 12. As seen most clearly in FIG. 2, the post 14 is angled vertically with respect to the bottom portion of the base member 12 along the x axis transverse to the Y axis. The first angle ranges from about 5° to about 45° from the x-axis and preferably is about 15° from the x-axis.

Figure 3:
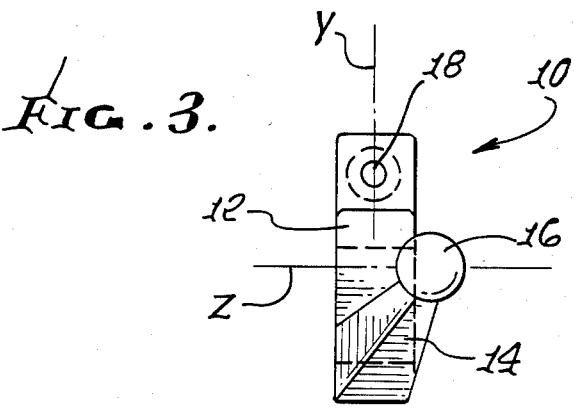
FIG. 3 is a front view of the device shown in FIG. 1 and illustrates the post of the device being angled both with respect to the x axis and z axis in accordance with the present invention.
Figure 4:
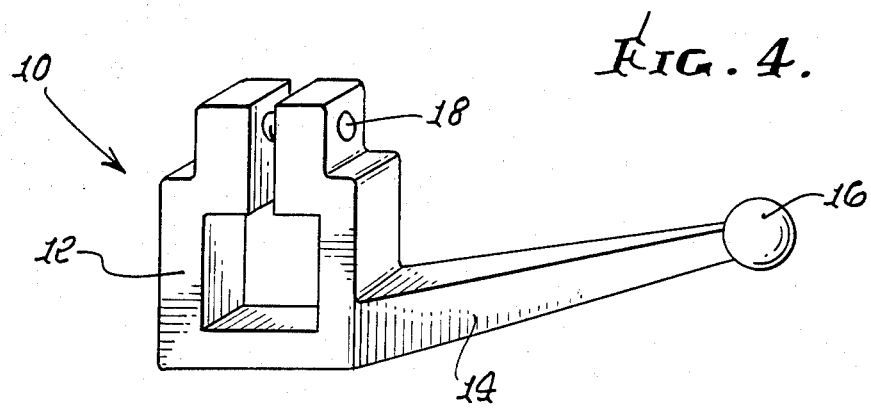
FIG. 4 is a perspective view of a unique support device shown in FIG. 2.

As shown most clearly in FIGS. 1 and 3, the post 14 is also angled with respect to the base member 12 along the Z axis transverse to the Y axis. This second angle also ranges from about 5° to about 45° from the Z axis and is preferably about 15° from the Z axis. FIG. 4 illustrates a perspective view of the device 10.

The post 14 preferably terminates with retaining means 16 which may be in the form of a ball, notch, lip or any other suitable configuration to prevent drafting work tools once placed on the post 14 from slipping off.

Figure 5:
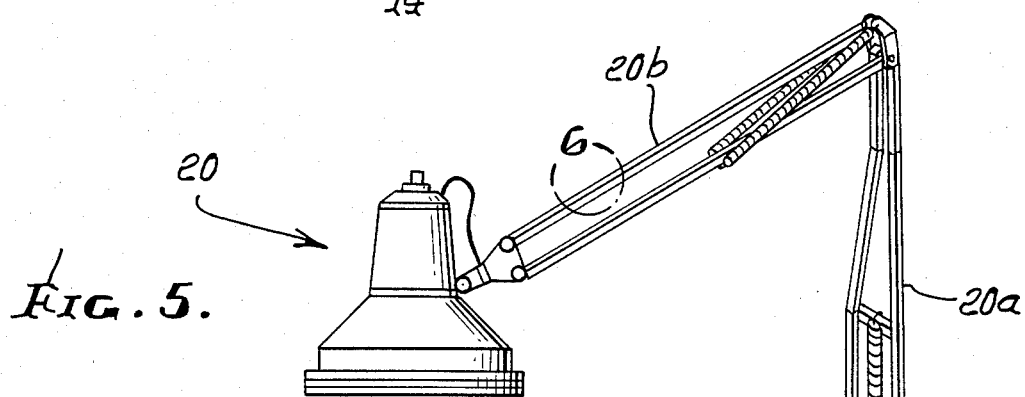
FIG. 5 is a perspective view of the unique support device suitably mounted in association with framework of a conventional overhead drafting/artist desk lamp.
Figure 6:
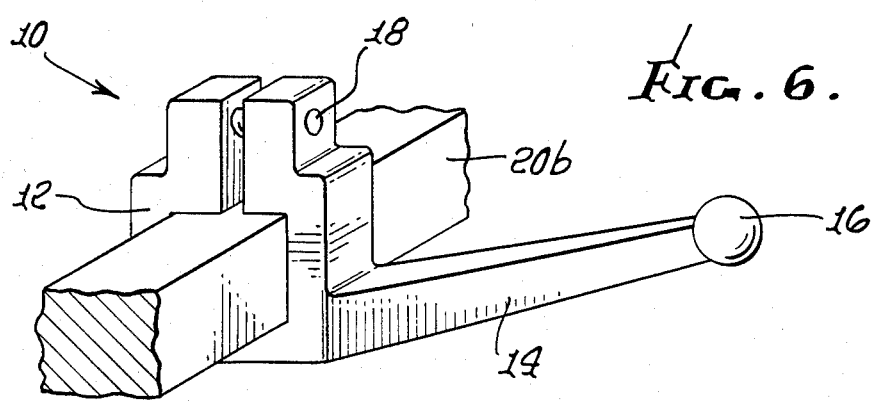
FIG. 6 is an enlarged fragmentary view of a portion of the desk lamp framework with the unique support device mounted thereon.

The compound angle of the unique support device accordingly enables the base member 12 to be mounted about either the vertical 20a or horizontal framework 20b of a conventional overhead artist/draftsman desk lamp 20 as seen in FIG. 5. An enlarged fragmentary view, FIG. 6, illustrates suitable mounting of the device 10 on framework 20a and 20b.

Typically, such desk lamp framework 20a, 20b comprises standard ⅜th inch square tubing. However, other common lamp framework is commercially available including a 1 inch round tubing; ½ inch round tubing; ½ inch square tubing; etc. Those skilled in the art will readily appreciate that the means for adjustably fastening the base member 12 to a vertical or horizontal arm of the lamp framework may be widely varied to accommodate numerous configuration and dimensions. In this respect, one specific embodiment has been shown in the drawings for circumscribing a ⅜th inch square tubing framework of a conventional lamp.

More particularly, the adjustable fastening means may generally be described as a split bracket of sufficient internal diameter to circumscribe the outer diameter of a square tubing type framework. A set screw 18 which is threaded through the top portion of the base member 12 may be suitably tightened to exert a compressive force of the base member 12 against the vertical or horizontal arm of the lamp around which it is placed.

Typically, a draftsman or artist may store conveniently ten or more work tools, such as templates and triangles of varying sizes by the inventive device. As readily apparent, these work tools will hang from the support post 14 within easy reach, for instance, while he or she is seated at an artist's desk.

Thus, the inventive support device enables the draftsman or artist to store templates, triangles and the like in a neat and orderly fashion, providing quick and accurate access to the work tool desired. Moreover, the problems associated with conventional cumbersome stacking of templates and triangles near the work surface is thereby avoided.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A support device particularly useful for holding drafting templates and the like in a condition readily accessible to a draftsman, the support device comprising:
   an integral base member having a substantially rectangular cross-section disposed with respect to X, Y, and Z orthogonal axes, said axes having a point of intersection with respect to one another; said base member being oriented with its center at the intersection of said X, Y, and Z orthogonal axes;
   means for adjustably fastening said base member to said support device said means provided at an upper side portion of said base member; and
   a substantially linear post extending outwardly from a lower side portion of said base member, said post being angled in a range of from about 5° to about 45° with respect to said X axis and said post being angled in a range of from about 5° to about 45° with respect to said Z axis.

2. The support device as defined in claim 1 wherein said post is angled at about 15° with respect to said x axis.

3. The support device as defined in claim 1 wherein said post is angled at about 15° with respect to said z axis.

4. The support device as defined in claim 1 wherein said means for adjustably fastening comprises a bracket having a screw threaded in a top portion thereof.

5. The support device as defined in claim 1 wherein said post terminates with a retaining element.

6. The support device as defined in claim 5 wherein said retaining element is a ball.

* * * * *